US005547907A

United States Patent [19]

Katsumata et al.

[11] Patent Number: 5,547,907

[45] Date of Patent: Aug. 20, 1996

[54] CRYSTALLIZED GLASS COMPOSITIONS FOR COATING OXIDE-BASED CERAMICS

[75] Inventors: Masaaki Katsumata, Neyagawa; Osamu Kanaya, Chitose; Nobuharu Katsuki, Neyagawa; Akihiro Takami, Katano, all of Japan

[73] Assignee: Matsushita Electric Industrial Co., Ltd., Osaka, Japan

[21] Appl. No.: 388,086

[22] Filed: Feb. 14, 1995

Related U.S. Application Data

[60] Continuation of Ser. No. 147,182, Nov. 1, 1993, Pat. No. 5,447,892, which is a division of Ser. No. 689,948, Jun. 26, 1991, Pat. No. 5,294,908.

[30] Foreign Application Priority Data

| | | | |
|---|---|---|---|
| Nov. 8, 1989 | [JP] | Japan | 1-290190 |
| Nov. 8, 1989 | [JP] | Japan | 1-290191 |
| Jan. 10, 1990 | [JP] | Japan | 2-3033 |
| Jan. 10, 1990 | [JP] | Japan | 2-3037 |
| Feb. 15, 1990 | [JP] | Japan | 2-35129 |

[51] Int. Cl.[6] .......... C03C 3/074

[52] U.S. Cl. .......... 501/76; 501/26; 501/49

[58] Field of Search .......... 501/10, 22, 23, 501/26, 49, 76, 134

[56] References Cited

U.S. PATENT DOCUMENTS

| | | | |
|---|---|---|---|
| 3,486,871 | 12/1969 | Martin | 501/10 |
| 3,755,720 | 8/1973 | Kern | 501/76 |
| 3,947,279 | 3/1976 | Hudecek | 501/76 |
| 3,959,543 | 5/1976 | Ellis | 428/66 |
| 4,319,215 | 3/1982 | Yamazaki et al. | 338/21 |
| 4,400,683 | 8/1983 | Eda et al. | 338/21 |
| 4,420,737 | 12/1983 | Miyoshi et al. | 338/21 |
| 4,436,829 | 3/1984 | Howell | 501/22 |
| 5,294,908 | 3/1994 | Katsumata et al. | 338/21 |

FOREIGN PATENT DOCUMENTS

| | | | |
|---|---|---|---|
| 0040043 | 11/1981 | European Pat. Off. . | |
| 3026200 | 1/1981 | Germany . | |
| 52-000812 | 1/1977 | Japan . | |
| 62-101002 | 5/1987 | Japan . | |
| 9001442 | 5/1991 | WIPO | H01C 7/10 |

*Primary Examiner*—Deborah Jones
*Attorney, Agent, or Firm*—Panitch Schwarze Jacobs & Nadel, P.C.

[57] ABSTRACT

The present invention relates to a zinc oxide varistor as a characteristic element of an arrestor for protecting a transmission and distribution line and peripheral devices thereof from surge voltage created by lightning, and more particularly a highly reliable zinc oxide varistor excellent in the non-linearity with respect to voltage, the discharge withstand current rating properties, and the life characteristics under voltage, a method of preparing the same, and PbO type crystallized glass for coating oxide ceramics employed for a zinc oxide varistor, etc. A zinc oxide varistor of the present invention comprises a sintered body (1) and a high resistive side layer (3) consisting of crystallized glass with high crystallinity containing the prescribed amount of $SiO_2$, $MoO_3$, $WO_3$, $TiO_2$, NiO, etc., formed on the sides of the sintered body (1) to enhance the strength and the insulating property thereof, thereby improving the non-linearity with respect to voltage, the discharge withstand current rating properties and the life characteristics under voltage. The crystallized glass composition for coating of the present invention comprises PbO as a main component and additives such as ZnO, $B_2O_3$, $SiO_2$, $MoO_3$, $WO_3$, $TiO_2$, and NiO to enhance the crystallinity and the insulating property thereof.

17 Claims, 1 Drawing Sheet

CRYSTALLIZED GLASS COMPOSITIONS FOR COATING OXIDE-BASED CERAMICS

CROSS REFERENCE TO RELATED APPLICATIONS

This is a continuation application of application Ser. No. 08/147,182filed , Nov. 1, 1993, now U.S. Pat. No. 5,447, 892, which is a divisional application of application Ser. No. 07/689,948 filed Jun. 26, 1991, now U.S. Pat. No. 5,294,908.

TECHNICAL FIELD

The present invention particularly relates to a zinc oxide varistor used in the field of an electric power system, a method of preparing the same, and a crystallized glass composition used for coating an oxide ceramic employed for a thermistor or a varistor.

BACKGROUND ART

A zinc oxide varistor comprising ZnO as a main component and several kinds of metallic oxides including $Bi_2O_3$, CoO, $Sb_2O_3$, $Cr_2O_3$, and $MnO_2$ as other components has a high resistance to surge voltage and excellent non-linearity with respect to voltage. Therefore, it has been generally known that the zinc oxide varistor is widely used as an element for a gapless arrestor in place of conventional silicon carbide varistors in recent years.

For example, Japanese Laid-open Patent Publication No. 62-101002, etc., disclose conventional methods of preparing a zinc oxide varistor. The aforesaid prior art reference discloses as follows: first, to ZnO as a main component are added metallic oxides such as $Bi_2O_3$, $Sb_2O_3$, $Cr_2O_3$, CoO, and $MnO_2$ each in an amount of 0.01 to 6.0 mol % to prepare a mixed powder. Then, the mixed powder thus obtained is blended and granulated. The resulting granules are molded by application of pressure in a cylindrical form, after which the molded body is baked in an electric furnace at 1200° C. for 6 hours. Next, to the sides of the sintered body thus obtained are applied glass paste consisting of 80 percent by weight of PbO type frit glass containing 60 percent by weight of PbO, 20 percent by weight of feldspar, and an organic binder by means of a screen printing machine in a ratio of 5 to 500 mg/cm$^2$ followed by baking treatment Next both end faces of the element thus obtained are subjected to surface polishing and then an aluminum metallikon electrode is formed thereon, thereby obtaining a zinc oxide varistor.

However, since a zinc oxide varistor prepared by the aforesaid conventional method employed screen printing, a high resistive side layer was formed with a uniform thickness. This led to an advantage in that discharge withstand current rating properties did not largely vary among varistors thus prepared, whereas since the high resistive side layer was made of composite glass consisting of PbO type frit glass and feldspar, the varistor also had disadvantages as follows: the discharge withstand current rating properties were poor, and the non-linearity with respect to voltage lowered during baking treatment of glass, thereby degrading the life characteristics under voltage.

DISCLOSURE OF INVENTION

The present invention overcomes the above conventional deficiencies. The objectives of the present invention are to provide a zinc oxide varistor with high reliability and a method of preparing the same. Another objective of the present invention is to provide a crystallized glass composition suited for coating an oxide ceramic employed for a varistor or a thermistor.

In the present invention, for the purpose of achieving the aforesaid objectives, to the sides of a sintered body comprising ZnO as a main component is applied crystallized glass comprising PbO as a main component such as PbO—ZnO—$B_2O_3$—$SiO_2$, $MoO_3$, $WoO_3$, NiO, $Fe_2O_3$, or $TiO_2$ type crystallized glass, followed by baking treatment, to form a high resistive side layer consisting of PbO type crystallized glass on the sintered body, thereby completing a zinc oxide varistor.

Furthermore, the present invention proposes a crystallized glass composition for coating an oxide ceramic comprising PbO as a main component, and other components such as ZnO, $B_2O_3$, $SiO_2$, $MoO_3$, $WO_3$, NiO, $Fe_2O_3$, and $TiO_2$.

Since crystallized glass comprising PbO as a main component according to the present invention has high strength of the coating film due to the addition of $SiO_2$, $MoO_3$, $WO_3$, NiO, $Fe_2O_3$, $TiO_2$, etc., and excellent adhesion to a sintered body, it has excellent discharge withstand current rating properties and high insulating properties. This results in a minimum decline in non-linearity with respect to voltage during baking treatment to obtain a highly reliable zinc oxide varistor with excellent life characteristics under voltage.

BEST MODE FOR CARRYING OUT THE INVENTION

Figure 1:
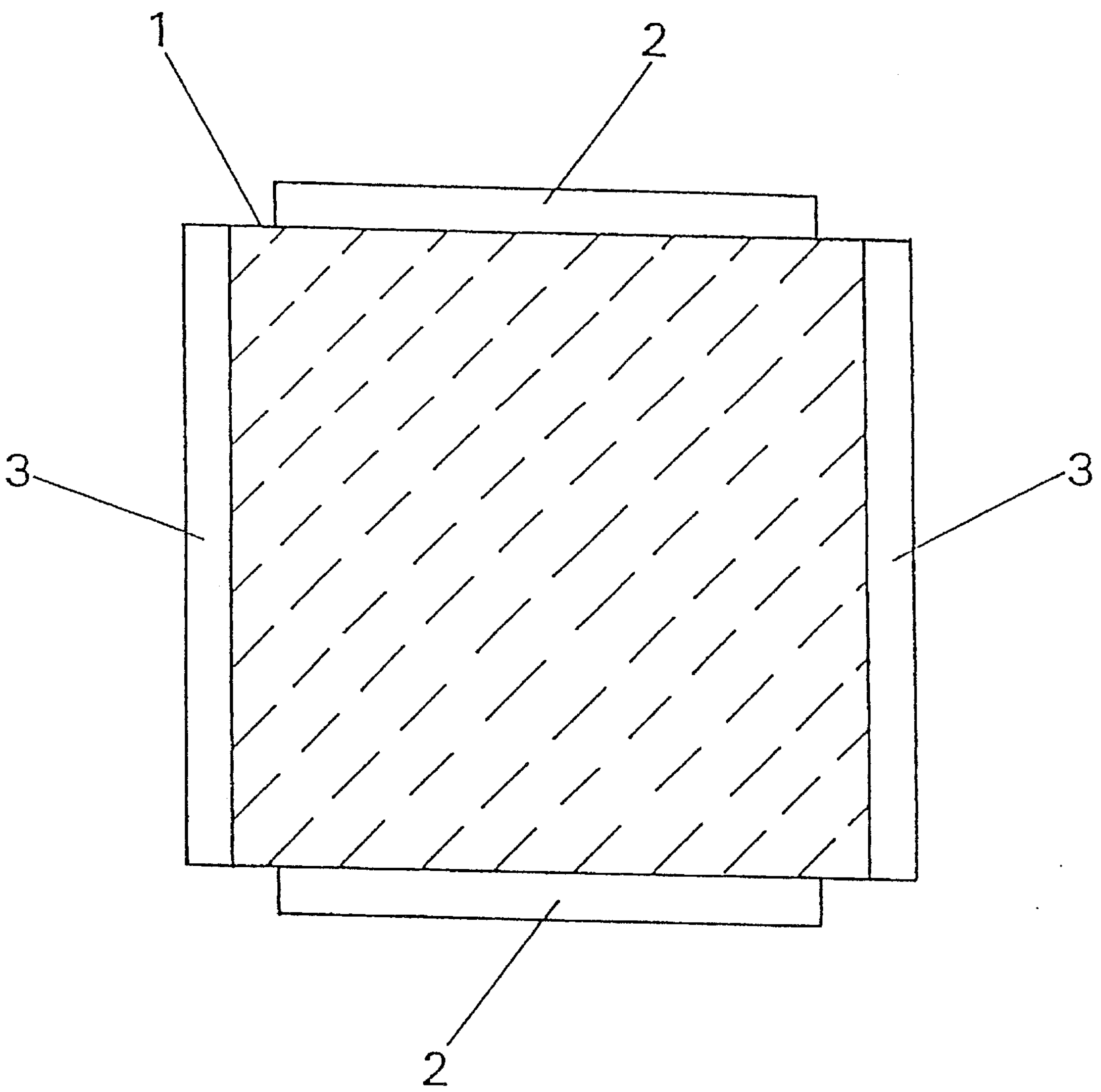
FIG. 1 shows across-sectional view of a zinc oxide varistor prepared by using PbO type crystallized glass according to the present invention.

A zinc oxide varistor, a method of preparing the same, and a crystallized glass composition for coating according to the present invention will now be explained in detail by reference to the following examples.

EXAMPLE 1

First, to a ZnO powder were added 0.5 mol % of $Bi_2O_3$, 0.5 mol % of $Co_2O_3$, 0.5 mol % of $MnO_2$, 1.0 mol of $Sb_2O_3$, 0.5 mol % of $Cr_2O_3$, 0.5 mol % of NiO, and 0.5 mol % of $SiO_2$ based on the total amount of the mixed powder. The resulting mixed powder was sufficiently blended and ground together with pure water, a binder, and a dispersing agent, for example, in a ball mill, after which the ground powder thus obtained was dried and granulated by means of a spray dryer to prepare a powder. Next, the resulting powder was subjected to compression molding to obtain a molded powder with a diameter of 40 mm and a thickness of 30 mm, followed by degreasing treatment at 900° C. for 5 hours. Thereafter, the resulting molded body was baked at 1150° C. for 5 hours to obtain a sintered body.

Alternatively, as for crystallized glass for coating, each predetermined amount of PbO, ZnO, $B_2O_3$, and $SiO_2$ was weighed, and then mixed and ground, for example, An a ball mill, after which the ground powder was melted at a temperature of 1100° C. and rapidly cooled in a platinum crucible to be vitrified. The resulting glass was subjected to coarse grinding, followed by fine grinding in a ball mill to obtain frit glass. On the other hand, as a control sample, composite glass consisting of 80.0 percent by weight of frit glass consisting of 70.0 percent by weight of PbO, 25.0 percent by weight of ZnO, and 5.0 percent by weight of $B_2O_3$, and 20.0 percent by weight of feldspar (feldspar is a solid solution comprising $KAlSi_3O_8$, $NaAlSi_3O_8$, and $CaAl_2Si_2O_8$) was prepared in the same process as described before. The composition, the glass transition point Tg, the coefficient of linear expansion α, and the crystallinity of the frit glass prepared in the aforesaid manner are shown in Table 1 below.

The glass transition point Tg and the coefficient of linear expansion u shown in Table 1 were measured by means of a thermal analysis apparatus. As for the crystallinity, the conditions of glass surface were observed by means of a metallurgical microscope or an electron microscope, after which a sample with high crystallinity was denoted by a mark "602", a sample with low crystallinity a mark "66", and a sample with no=crystal a mark "x".

TABLE 1

| Name | Composition (Percent by weight) | | | | Tg | α ($10^{-7}$/ | Crystal- |
|---|---|---|---|---|---|---|---|
| of glass | PbO | ZnO | $B_2O_3$ | $SiO_2$ | (°C.) | °C.) | linity |
| G101* | 40 | 25 | 10 | 25 | 470 | 61 | O |
| G102 | 50 | 25 | 10 | 15 | 456 | 68 | O |
| G103 | 60 | 15 | 10 | 15 | 432 | 79 | O |
| G104 | 75 | 15 | 5 | 10 | 385 | 85 | O |
| G105* | 80 | 5 | 5 | 10 | 380 | 93 | X |
| G106* | 60 | 10 | 5 | 25 | 363 | 70 | O |
| G107 | 60 | 15 | 5 | 20 | 375 | 66 | O |
| G108 | 60 | 29 | 5 | 6 | 404 | 72 | O |
| G109* | 60 | 35 | 15 | 0 | 409 | 69 | O |
| G110* | 65 | 25 | 2.5 | 7.5 | 351 | 73 | O |
| G111 | 62.5 | 25 | 5 | 7.5 | 388 | 75 | O |
| G112 | 57.5 | 25 | 10 | 7.5 | 380 | 70 | O |
| G113* | 52.5 | 25 | 15 | 7.5 | 427 | 66 | X |
| G114* | 66 | 20 | 10 | 4 | 350 | 79 | O |
| G115 | 64 | 20 | 10 | 6 | 374 | 75 | O |
| G116 | 60 | 20 | 10 | 10 | 396 | 70 | O |
| G117 | 55 | 20 | 10 | 15 | 402 | 66 | O |
| G118* | 50 | 20 | 10 | 20 | 448 | 59 | X |

A mark "*" denotes a control sample which is not within the scope of the present invention.

As shown in Table 1, the addition of a large amount of PbO raises the coefficient of linear expansion α, while the addition of a large amount of ZnO lowers the glass transition point Tg, which facilitates crystallization of the glass composition. Conversely, the addition of a large amount of $B_2O_3$ raises the glass transition point, and the addition of more than 15.0 percent by weight of $B_2O_3$ causes difficulty in crystallization of the glass composition. Further, with an increase in the amount of $SiO_2$ added, the glass transition point tends to increase, while the coefficient of linear expansion tends to decrease.

Next, 85 percent by weight of the frit glass of the aforementioned sample and 15 percent by weight of a mixture of ethyl cellulose and butyl carbitol acetate as an organic binder were sufficiently mixed, for example, by a triple roll mill, to obtain glass paste for coating. The glass paste for coating thus obtained was printed on the sides of the aforesaid sintered body by means of, for example, a screen printing machine for curved surface with a screen of 125 to 250 mesh. In this process, the amount of the glass paste for coating to be applied was determined by measurement of a difference in weight between the sintered bodies prior and posterior to a process for coating with paste and drying for 30 minutes at 150° C. The amount of the glass paste for coating to be applied was also adjusted by adding an organic binder and n-butyl acetate thereto. Thereafter, the glass paste for coating was subjected to baking treatment at temperatures in the range of 350° to 700° C. to form a high resistive side layer on the sides of the sintered body. Next, the both end faces of the sintered body were subjected to surface polishing, and then an aluminum metallikon electrode was formed thereon, thereby obtaining a zinc oxide varistor.

BRIEF DESCRIPTION OF THE DRAWINGS

FIG. 1 shows a cross-sectional view of a zinc oxide varistor obtained in the aforesaid manner according to the present invention. In FIG. 1, the reference numeral 1 denotes a sintered body comprising zinc oxide as a main component, 2 an electrode formed on both end faces of the sintered body 1, and 3 a high resistive side layer obtained by a process for baking crystallized glass on the sides of the sintered body 1.

Next, the appearance, $V_{1mA}/V_{10\mu A}$, the discharge withstand current rating properties, and the life characteristics under voltage of a zinc oxide varistor prepared by using the glass for coating shown in Table 1 above are shown in Table 2 below. The viscosity of the glass paste for coating was controlled so that the paste could be applied in a ratio of 50 $mg/cm^2$. The baking treatment was conducted at a temperature of 550° C. for 1 hour. Each lot has 5 samples. $V_{1mA}/V_{10\mu A}$ was measured by using a DC constant-current source. The discharge withstand current rating properties were examined by applying an impulse current of 4/10 μS to each sample at five-minute intervals in the same direction twice and stepping up the current from 40 kA. Then, whether any unusual appearance was observed or not was examined visually, or, if necessary, by means of a metallurgical microscope. In the Table, the mark "o" denotes that no unusual appearance was observed in a sample after the prescribed electric current was applied to the sample twice. The mark "Δ" and "x" denote that unusual appearance was observed in 1 to 2 samples, and 3 to 5 samples, respectively. Further, with the life characteristics under voltage, the time required for leakage current to reach 5 mA, i.e., a peak value was measured at ambient temperature of 130° C. and a rate of applying voltage of 95% (AC, peak value). $V_{1mA}/V_{10\mu A}$ and the life characteristics under voltage are represented by an average of those of samples.

The number of samples, the method of measuring $V_{1mA}/V_{10\mu A}$, the method of testing the discharge withstand current rating, and the method of evaluating the life characteristics under voltage described above will be adopted unchanged in each following examples unless otherwise stated.

TABLE 2

| Name of glass | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|
| G101* | Partially peel off | 1.15 | 185 | X | — | — | — | — |
| G102 | Good | 1.21 | 206 | O | O | O | X | — |
| G103 | Good | 1.23 | 370 | O | O | O | Δ | X |
| G104 | Good | 1.34 | 320 | O | O | Δ | X | — |
| G105* | Crack | 1.19 | 96 | X | — | — | — | — |
| G106 | Porous | 1.16 | 340 | Δ | X | — | — | — |
| G107 | Good | 1.18 | 314 | O | O | O | X | — |
| G108 | Good | 1.25 | 291 | O | O | X | — | — |
| G109* | Good | 1.38 | 158 | O | X | — | — | — |
| G110* | Good | 1.20 | 369 | O | O | X | — | — |
| G111 | Good | 1.21 | 351 | O | O | Δ | X | — |
| G112 | Good | 1.19 | 332 | O | O | O | X | — |
| G113* | Porous | 1.18 | 345 | Δ | X | — | — | — |
| G114* | Good | 1.34 | 171 | O | O | X | — | — |
| G115 | Good | 1.25 | 243 | O | O | O | O | X |
| G116 | Good | 1.21 | 297 | O | O | O | O | Δ |
| G117 | Good | 1.19 | 495 | O | O | O | X | — |
| G118* | Peel off | 1.17 | 331 | X | — | — | — | — |
| Conventional example | Good | 1.26 | 153 | O | Δ | X | — | — |

A mark "*" denotes a control sample which is not with in the scope of the present invention.

The data shown in Tables 1 and 2 indicated that when the coefficient of linear expansion of glass for coating was smaller than $65\times10^{-7}$/°C. G101, G118 glass), the glass tended to peel off, and when exceeding $90\times10^{-7}$/°C., the glass tended to crack. It is also confirmed that the samples of glass which cracked or peeled off have poor discharge withstand current rating properties due to the inferior insulating properties of the high resistive side layer. However, even if the coefficient of linear expansion of glass for coating is within the range of $65\times10^{-7}$ to $90\times10^{-7}$/°C., glass with poor crystallinity (G105, G113 glass) tends to crack and also has poor discharge withstand current rating properties. This may be attributed to the fact that the coating film of crystallized glass has lower strength than that of noncrystal glass. The addition of ZnO as a component of crystallized glass is useful for the improvement of the physical properties, especially, a decrease in the glass transition point of glass without largely affecting the various electric characteristics and the reliability of a zinc oxide varistor. It is also confirmed that when conventional composite glass consisting of PbO—ZnO—$B_2O_3$ glass and feldspar, i.e., a control sample, is used, the life characteristics under voltage is at a practical level, while the discharge withstand current rating properties are poor.

The amount of $SiO_2$ added will now be considered. First, any composition with less than 6.0 percent by weight of $SiO_2$ added has inferior life characteristics under voltage. This may be attributed to the fact that the addition of less than 6.0 percent by weight of $SiO_2$ lowers the insulation resistance of the coating film. On the other hand, the addition of more than 15.0 percent by weight of $SiO_2$ lowers the discharge withstand current rating properties. This may be attributed to the fact that glass tends to become porous due to its poor fluidity during the baking process. Consequently, a crystallized glass composition comprising PbO as a main component for the high resistive side layer of a zinc oxide varistor is required to comprise $SiO_2$ at least in an amount of 6.0 to 15.0 percent by weight.

The above results confirmed that the most preferable crystallized glass composition for coating comprised 50.0 to 75.0 percent by weight of PbO, 10.0 to 30.0 percent by weight of ZnO, 5.0 to 10.0 percent by weight of $B_2O_3$, and 6.0 to 15.0 percent by weight of $SiO_2$. A crystallized glass composition for the high resistive side layer of a zinc oxide varistor is also required to have coefficients of linear expansion in the range of $65\times10^{-7}$ to $90\times10^{-7}$/°C.

Next, by the use of G111 glass shown as a sample of the present invention in Table 1, the amount of glass paste to be applied was examined. The results are shown in Table 3 below. Glass paste was applied in a ratio of 1.0 to 300.0 mg/cm$^2$ which was controlled by the viscosity and the number of application of the paste. As shown in Table 3, when glass paste is applied in a ratio of less than 10.0 mg/cm$^2$ the resulting coating film has low strength, while with a ratio of more than 150.0 mg/cm$^2$ glass tends to have pinholes. Both cases result in poor discharge withstand current rating properties. These results confirmed that glass paste was applied most preferably in a ratio of 10.0 to 150.0 mg/cm$^2$.

TABLE 3

| Sample No. | Amount of application (mg/cm$^2$) | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|---|
| 101* | 1 | Good | 1.14 | 367 | X | — | — | — | — |
| 102* | 3 | Good | 1.15 | 354 | Δ | X | — | — | — |
| 103* | 5 | Good | 1.20 | 360 | Δ | X | — | — | — |

TABLE 3-continued

| Sample No. | Amount of application (mg/cm$^2$) | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|---|
| 104 | 10 | Good | 1.23 | 394 | O | O | Δ | X | — |
| 105 | 50 | Good | 1.21 | 351 | O | O | Δ | X | — |
| 106 | 150 | Good | 1.28 | 308 | O | O | O | Δ | X |
| 107* | 200 | Partially flow | 1.33 | 269 | O | X | — | — | — |
| 108* | 300 | Flow | 1.30 | 245 | X | — | — | — | — |

A mark "*" denotes a control sample which is not within the scope of the present invention.

Next, by the use of G111 glass shown as a sample of the present invention in Table 1, the conditions under which glass paste was subjected to baking treatment were examined. The results are shown in Table 4 below. The viscosity of glass paste was controlled so that the glass paste may be applied in a ratio of 50.0 mg/cm$^2$. Glass paste was subjected to baking treatment at temperatures in the range of 350° to 700° C. for 1 hour in air. Apparent from Table 4, when baking treatment was conducted at a temperature of less than 450° C., glass was not sufficiently melted, resulting in poor discharge withstand current rating properties. On the other hand, when baking treatment was conducted at a temperature of more than 650° C., the voltage ratio markedly lowered, resulting in poor life characteristics under voltage. These results indicated that glass paste was subjected to baking treatment most preferably at temperatures in the range of 450° to 650° C. It was also confirmed that the baking treatment conducted for 10 minutes or more had no serious effect on various characteristics.

TABLE 4

| Sample No. | Temperature of baking (°C.) | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|---|
| 111* | 350 | Not sintered | 1.08 | 51 | X | — | — | — | — |
| 112* | 400 | Porous | 1.12 | 77 | Δ | X | — | — | — |
| 113 | 450 | Good | 1.24 | 224 | O | O | Δ | X | — |
| 114 | 500 | Good | 1.21 | 365 | O | O | Δ | X | — |
| 115 | 600 | Good | 1.33 | 408 | O | O | O | Δ | X |
| 116 | 650 | Good | 1.40 | 215 | O | O | O | X | — |
| 117* | 700 | Partially flow | 1.79 | 19 | O | X | — | — | — |

A mark "*" denotes a control sample which is not with in the scope of the present invention.

EXAMPLE 2

Crystallized glass comprising PbO as a main component which contains $MoO_3$, and a zinc oxide varistor using the same as a material constituting a high resistive side layer will now be explained.

First, each predetermined amount of PbO, ZnO, $B_2O_3$, $SiO_2$, and $MoO_3$ was weighed, and then crystallized glass for coating was prepared according to the same process as that used in Example 1 described before. The results are shown in Table 5 below.

TABLE 5

| Name of glass | Composition (Percent by weight) PbO | ZnO | $B_2O_3$ | $SiO_2$ | $MoO_3$ | Tg (°C.) | α ($10^{-7}$/°C.) | Crystallinity |
|---|---|---|---|---|---|---|---|---|
| G201* | 40 | 25 | 5 | 10 | 20 | 349 | 61 | O |
| G202 | 50 | 25 | 5 | 10 | 10 | 355 | 75 | O |
| G203 | 75 | 10 | 5 | 5 | 5 | 336 | 88 | O |
| G204* | 85 | 10 | 5 | 0 | 0 | 315 | 96 | X |

TABLE 5-continued

| Name of glass | Composition (Percent by weight) PbO | ZnO | $B_2O_3$ | $SiO_2$ | $MoO_3$ | Tg (°C.) | α ($10^{-7}$/°C.) | Crystallinity |
|---|---|---|---|---|---|---|---|---|
| G205* | 55 | 40 | 5 | 0 | 0 | 350 | 60 | O |
| G206 | 55 | 30 | 10 | 0 | 5 | 355 | 67 | O |
| G207 | 70 | 5 | 15 | 5 | 5 | 366 | 75 | Δ |
| G208* | 70 | 0 | 20 | 5 | 5 | 375 | 87 | X |
| G209 | 67.5 | 20 | 10 | 0 | 2.5 | 378 | 79 | O |
| G210 | 67.4 | 20 | 10 | 0.1 | 2.5 | 382 | 80 | O |
| G211 | 62.5 | 20 | 10 | 5 | 2.5 | 388 | 75 | O |
| G212 | 57.5 | 20 | 10 | 10 | 2.5 | 400 | 73 | O |
| G213* | 47.5 | 20 | 10 | 20 | 2.5 | 405 | 68 | O |
| G214* | 59.99 | 20 | 10 | 10 | 0.01 | 395 | 70 | O |
| G215 | 59.9 | 20 | 10 | 10 | 0.1 | 398 | 69 | O |
| G216 | 55 | 20 | 10 | 10 | 5 | 404 | 72 | O |
| G217 | 50 | 20 | 10 | 10 | 10 | 405 | 68 | O |
| G218* | 45 | 20 | 10 | 10 | 15 | 410 | 62 | O |

A mark "*" denotes a control sample which is not within the scope of the present invention.

As shown in Table 5, the addition of a large amount of PbO raises the coefficient of linear expansion (α), while the addition of a large amount of ZnO lowers the glass transition point (Tg), which facilitates crystallization of the glass composition. Conversely, the addition of a large amount of $B_2O_3$ raises the glass transition point, and the addition of more than 15.0 percent by weight of $B_2O_3$ causes difficulty in crystallization of the glass composition. Further, with an increase in the amount of $SiO_2$ added, the glass transition point tends to increase, while the coefficient of linear expansion tends to decrease. With an increase in the amount of $MoO_3$ added, the crystallization of glass proceeded. The glass composition comprising a small amount of PbO and $B_2O_3$ tended to become porous.

Next, the aforesaid frit glass was made into paste, after which the resulting glass paste was applied to the sides of the sintered body of Example 1, followed by baking treatment to prepare a sample of a zinc oxide varistor in the same process as that used in the above example. Thereafter, the resulting samples were evaluated for their characteristics.

The results are shown in Table 6 below.

TABLE 6

| Name of glass | Appearance | $V_{1\ mA}/V_{10\ \mu A}$ | Life under voltage | Discharge withstand current rating properties 40 kA | 50 kA | 60 kA | 70 kA | 80 kA |
|---|---|---|---|---|---|---|---|---|
| G201* | Peel off | 1.16 | 352 | X | — | — | — | — |
| G202 | Good | 1.17 | 450 | O | O | O | X | — |
| G203 | Good | 1.23 | 381 | O | O | Δ | X | — |
| G204* | Crack | 1.55 | 15 | X | — | — | — | — |
| G205* | Partially peel off | 1.31 | 181 | Δ | X | — | — | — |
| G206 | Good | 1.20 | 319 | O | O | O | Δ | X |
| G207 | Good | 1.19 | 485 | O | O | X | — | — |
| G208* | Partially crack | 1.31 | 238 | X | — | — | — | — |
| G209 | Good | 1.29 | 256 | O | X | — | — | — |
| G210 | Good | 1.28 | 363 | O | O | Δ | X | — |
| G211 | Good | 1.23 | 472 | O | O | O | X | — |
| G212 | Good | 1.20 | 550 | O | O | X | — | — |
| G213* | Porous | 1.18 | 316 | X | — | — | — | — |
| G214* | Good | 1.34 | 230 | Δ | X | — | — | — |
| G215 | Good | 1.17 | 434 | O | O | X | — | — |
| G216 | Good | 1.15 | 890 | O | O | O | O | X |
| G217 | Good | 1.13 | 950 | O | O | O | X | — |
| G218* | Porous | 1.21 | 241 | X | — | — | — | — |
| Conventional example | Good | 1.26 | 153 | O | Δ | X | — | — |

A mark "*" denotes a control sample which is not within the scope of the present invention.

The data shown in Tables 5 and 6 indicated that when the coefficient of linear expansion of glass for coating was smaller than $65 \times 10^{-7}$/°C. (G201, G205, G218 glass), the glass tended to peel off, and when exceeding $90 \times 10^{-7}$/°C. (G204 glass), the glass tended to crack. It is supposed that the samples of glass which cracked or peeled off have poor discharge withstand current rating properties due to the inferior insulating properties of the high resistive side layer. However, even if the coefficient of linear expansion of glass for coating is within the range of $65 \times 10^{-7}$ to $90 \times 10^{-7}$/°C., glass with poor crystallinity (G208 glass) tends to crack and also has poor discharge withstand current rating properties. This may be attributed to the fact that the coating film of crystallized glass has higher strength than that of noncrystal glass.

The amount of $MoO_3$ added will now be considered. First, any composition with 0.1 percent by weight or more of $MoO_3$ added has improved non-linearity with respect to voltage, accompanied by the improved life characteristics under voltage. This may be attributed to the fact that the addition of 0.1 percent by weight or more of $MoO_3$ raises the insulation resistance of the coating film. On the other hand, the addition of more than 10.0 percent by weight of $MoO_3$lowers the discharge withstand current rating properties. This may be attributed to the fact that glass tends to become porous due to its poor fluidity during baking process. Consequently, a PbO—ZnO—$B_2O_3$—$SiO_2$—$MoO_3$type crystallized glass composition for the high resistive side layer of a zinc oxide varistor is required to comprise $MoO_3$ at least in an amount of 0.1 to 10.0 percent by weight.

The above results confirmed that the most preferable crystallized glass composition for coating comprised 50.0 to 75.0 percent by weight of PbO, 10.0 to 30.0 percent by weight of ZnO, 5.0 to 10.0 percent by weight of $B_2O_3$, 0 to 15.0 percent by weight of $SiO_2$, and 0.1 to 10.0 percent by weight of $MoO_3$. The crystallized glass composition for the high resistive side layer of a zinc oxide varistor is also required to have coefficients of linear expansion in the range of $65\times10^{-7}$ to $90\times10^{-7}$/°C.

Next, by the use of G206 glass shown as a sample of the present invention in Table 5, the amount of glass paste to be applied was examined. The results are shown in Table 7 below. Glass paste was applied in a ratio of 1.0 to 300.0 mg/cm$^2$ which was controlled by the viscosity and the number of application of the paste. As shown in Table 7, when glass paste is applied in a ratio of less than 10.0 mg/cm$^2$ the resulting coating film has low strength, while with a ratio of more than 150.0 mg/cm$^2$ glass tends to flow or have pinholes. Both cases result in poor discharge withstand current rating properties. These results indicated that glass paste was applied most preferably in a ratio of 10.0 to 150.0 mg/cm$^2$.

TABLE 7

| Sample No. | Amount of application (mg/cm$^2$) | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|---|
| 201* | 1 | Good | 1.10 | 318 | X | — | — | — | — |
| 202* | 5 | Good | 1.13 | 364 | Δ | X | — | — | — |
| 203 | 10 | Good | 1.14 | 913 | O | O | O | X | — |
| 204 | 50 | Good | 1.15 | 890 | O | O | O | O | X |
| 205 | 150 | Good | 1.20 | 592 | O | O | O | Δ | X |
| 206* | 200 | Partially flow | 1.29 | 387 | O | X | — | — | — |
| 207* | 300 | Flow | 1.30 | 311 | X | — | — | — | — |

A mark "*" denotes a control sample which is not within the scope of the present invention.

Next, by the use of G206 glass shown as a sample of the present invention in Table 5, the conditions under which glass paste was subjected to baking treatment were examined. The results are shown in Table 8 below. The viscosity of glass paste was controlled so that the glass paste may be applied in a ratio of 50.0 mg/cm$^2$. Glass paste was subjected to baking treatment at temperatures in the range of 350° to 700° C. for 1 hour in air. As a result, when baking treatment was conducted at a temperature of less than 450° C., glass paste was not sufficiently melted, resulting in poor discharge withstand current rating properties. On the other hand, when baking treatment was conducted at a temperature of more than 650° C., the voltage ratio markedly lowered, resulting in poor life characteristics under voltage. These results indicated that glass paste was subjected to baking treatment most preferably at temperatures in the range of 450° to 650° C.

TABLE 8

| Sample No. | Temperature of baking (°C.) | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|---|
| 211* | 350 | Not Sintered | 1.12 | 48 | X | — | — | — | — |
| 212* | 400 | Porous | 1.13 | 52 | X | — | — | — | — |
| 213 | 450 | Good | 1.15 | 431 | O | O | X | — | — |
| 214 | 500 | Good | 1.15 | 980 | O | O | O | Δ | X |
| 215 | 600 | Good | 1.22 | 850 | O | O | O | Δ | X |
| 216 | 650 | Good | 1.32 | 452 | O | O | X | — | — |
| 217* | 700 | Flow | 1.76 | 5 | X | — | — | — | — |

A mark "*" denotes a control sample which is not within the scope of the present invention.

EXAMPLE 3

Crystallized glass comprising PbO as a main component which contains $WO_3$, and a zinc oxide varistor using the same as a material constituting a high resistive side layer will now be explained.

First, each predetermined amount of PbO, ZnO, $B_2O_3$, $SiO_2$, and $MoO_3$ was weighed, and then crystallized glass for coating was prepared according to the same process as that used in Example 1 described before. The crystallized glass thus obtained was evaluated for the glass transition point (Tg), the coefficient of linear expansion (α), and the crystallinity. The results are shown in Table 9 below.

TABLE 9

| Name of glass | Composition (percent by weight) PbO | ZnO | $B_2O_3$ | $SiO_2$ | $WO_3$ | Tg (°C.) | α ($10^{-7}$/°C.) | Crystallinity |
|---|---|---|---|---|---|---|---|---|
| G301* | 40 | 25 | 5 | 10 | 20 | 355 | 60 | O |
| G302 | 50 | 25 | 5 | 10 | 10 | 361 | 73 | O |
| G303 | 75 | 10 | 5 | 5 | 5 | 340 | 89 | O |
| G304* | 85 | 10 | 5 | 0 | 0 | 315 | 96 | X |
| G305* | 50 | 40 | 5 | 5 | 0 | 342 | 62 | O |
| G306 | 50 | 30 | 10 | 5 | 5 | 351 | 66 | O |
| G307 | 65 | 5 | 15 | 5 | 5 | 372 | 73 | X |
| G308* | 70 | 0 | 20 | 5 | 5 | 384 | 88 | X |
| G309* | 67.4 | 20 | 10 | 0.1 | 2.5 | 380 | 81 | O |
| G310 | 67.0 | 20 | 10 | 0.5 | 2.5 | 384 | 80 | O |
| G311 | 62.5 | 20 | 10 | 5 | 2.5 | 392 | 76 | O |
| G312 | 57.5 | 20 | 10 | 10 | 2.5 | 401 | 72 | O |
| G313* | 47.5 | 20 | 10 | 20 | 2.5 | 406 | 67 | O |
| G314* | 59.9 | 20 | 10 | 10 | 0.1 | 396 | 71 | O |
| G315 | 59.5 | 20 | 10 | 10 | 0.5 | 399 | 72 | O |
| G316 | 55 | 20 | 10 | 10 | 5 | 404 | 70 | O |
| G317 | 50 | 20 | 10 | 10 | 10 | 405 | 68 | O |
| G318* | 45 | 20 | 10 | 10 | 15 | 412 | 66 | O |

A mark "*" denotes a control sample which is not within the scope of the present invention.

As shown in Table 9, the addition of a large amount of PbO raises the coefficient of linear expansion, while the addition of a large amount of ZnO lowers the glass transition point (Tg), which facilitates crystallization of the glass composition. Conversely, the addition of a large Mount of $B_2O_3$ raises the glass transition point, and the addition of more than 15.0 percent by weight of $B_2O_3$ causes difficulty in crystallization of the glass composition. Further, with an increase in the Mount of $SiO_2$ added, the glass transition point tends to increase, while the coefficient of linear expansion tends to decrease. With an increase in the amount of $WO_3$ added, the crystallization of glass proceeded.

Next, the aforesaid frit glass was made into paste, after which the resulting glass paste was applied to the sides of the sintered body of Example 1, followed by baking treatment to prepare a sample of a zinc oxide varistor in the same process as that used in Example 1 above. Thereafter, the resulting samples were evaluated for their characteristics.

The results are shown in Table 10 below.

TABLE 10

| Name of glass | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|
| G301* | peel off | 1.19 | 346 | X | — | — | — | — |
| G302 | Good | 1.20 | 400 | O | O | Δ | X | — |
| G303 | Good | 1.30 | 292 | O | O | O | X | — |
| G304* | Crack | 1.55 | 15 | X | — | — | — | — |
| G305* | Partially Peel off | 1.36 | 142 | X | — | — | — | — |
| G306 | Good | 1.24 | 280 | O | O | O | Δ | X |
| G307 | Good | 1.21 | 397 | O | Δ | X | — | — |
| G308* | Partially crack | 1.34 | 221 | X | — | — | — | — |
| G309* | Good | 1.31 | 260 | O | X | — | — | — |
| G310 | Good | 1.29 | 334 | O | O | Δ | X | — |
| G311 | Good | 1.25 | 415 | O | O | O | X | — |
| G312 | Good | 1.22 | 490 | O | O | X | — | — |
| G313* | Porous | 1.18 | 345 | X | — | — | — | — |
| G314* | Good | 1.35 | 247 | O | X | — | — | — |
| G315 | Good | 1.29 | 330 | O | O | X | — | — |
| G316 | Good | 1.18 | 451 | O | O | O | Δ | X |
| G317 | Good | 1.15 | 600 | O | O | Δ | X | — |
| G318* | Porous | 1.20 | 298 | X | — | — | — | — |
| Conventional example | Good | 1.26 | 153 | O | Δ | X | — | — |

A mark "*" denotes a control sample which is not within the scope of the present invention.

The data shown in Tables 9 and 10 indicated that when the coefficient of linear expansion of glass for coating was smaller than 65×10$^{-7}$/°C. (G301, G305 glass), the glass tended to peel off, and when exceeding 90×10$^{-7}$/°C., the glass tended to crack. It is supposed that the samples of glass which cracked or peeled off have poor discharge withstand current rating properties due to the inferior insulating properties of the high resistive side layer. However, even if the coefficient of linear expansion of glass for coating is within the range of 65×10$^{-7}$ to 90×10$^{-7}$/°C., glass with poor crystallinity (G304, G308 glass) tends to crack and also has poor discharge withstand current rating properties. This may be attributed to the fact that the coating film of crystallized glass has lower strength than that of noncrystal glass.

The amount of $WO_3$ added will now be considered. First, any composition with 0.5 percent by weight or more of $WO_3$ added has the improved non-linearity with respect to voltage, accompanied by the improved life characteristics under voltage. This may be attributed to the fact that the addition of 0.5 percent by weight or more of $WO_3$ raises the insulation resistance of the coating film. On the other hand, the addition of more than 10.0 percent by weight of $WO_3$ (G1glass) lowers the discharge withstand current rating properties. This may be attributed to the fact that glass tends to become porous due to its poor fluidity during baking process. Consequently, a crystallized glass composition comprising PbO as a main component for the high resistive side layer of a zinc oxide varistor is required to comprise $WO_3$ at least in an amount of 0.5 to 10.0 percent by weight.

The above results confirmed that the most preferable crystallized glass composition comprised 50.0 to 75.0 percent by weight of PbO, 10.0 to 30.0 percent by weight of ZnO, 5.0 to 15.0 percent by weight of $B_2O_3$, 0.5 to 15.0 percent by weight of $SiO_2$, and 0.5 to 10.0 percent by weight of $WO_3$. A crystallized glass composition for the high resistive side layer of a zinc oxide varistor is also required to have coefficients of linear expansion in the range of 65×10$^{-7}$/°C. to 90×10$^{-7}$/°C.

Next, by the use of G316 glass shown as a sample of the present invention in Table 9, the amount of glass paste to be applied was examined. The results are shown in Table 11 below. Glass paste was applied in a ratio of 1.0 to 300.0 mg/cm$^2$ which was controlled by the viscosity and the number of application of the paste. As shown in Table 11, when glass paste is applied in a ratio of less than 10.0 mg/cm$^2$ the resulting coating film has low strength, while with a ratio of more than 150.0 mg/cm$^2$ glass tends to have pinholes. Both cases result in poor discharge withstand current rating properties. These results indicated that glass paste was applied most preferably in a ratio of 10.0 to 150.0 mg/cm$^2$.

TABLE 11

| Sample No. | Amount of application (mg/cm$^2$) | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|---|
| 301* | 1 | Good | 1.11 | 309 | X | — | — | — | — |
| 302* | 5 | Good | 1.13 | 362 | Δ | X | — | — | — |
| 303 | 10 | Good | 1.14 | 578 | O | O | Δ | X | — |
| 304 | 50 | Good | 1.18 | 451 | O | O | O | Δ | X |

TABLE 11-continued

| Sample No. | Amount of application (mg/cm$^2$) | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|---|
| 305 | 150 | Good | 1.21 | 490 | O | O | O | O | X |
| 306* | 200 | Partially flow | 1.28 | 300 | O | X | — | — | — |
| 307* | 300 | Flow | 1.31 | 241 | Δ | X | — | — | — |

A mark "*" denotes a control sample which is not within the scope of the present invention.

Next, by the use of G316 glass shown as a sample of the present invention in Table 9, the conditions under which glass paste was subjected to baking treatment were examined. The results are shown in Table 12 below. The viscosity and the number of application of glass paste were controlled so that the glass paste may be applied in a ratio of 50.0 mg/cm$^2$. Glass paste was subjected to baking treatment at temperatures in the range of 350° to 700° C. for 1 hour in air. Apparent from Table 12, when baking treatment was conducted at a temperature of less than 450° C., glass paste was not sufficiently melted, resulting in poor discharge withstand current rating properties. On the other hand, when baking treatment was conducted at a temperature of more than 600° C., the voltage ratio markedly lowered, resulting in poor life characteristics under voltage. These results indicated that glass paste was subjected to baking treatment most preferably at temperatures in the range of 450° to 600° C.

TABLE 12

| Sample No. | Temperature of baking (°C.) | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|---|
| 311* | 350 | Not sintered | 1.10 | 45 | X | — | — | — | — |
| 312* | 400 | Porous | 1.12 | 42 | X | — | — | — | — |
| 313 | 450 | Good | 1.15 | 230 | O | O | X | — | — |
| 314 | 500 | Good | 1.16 | 547 | O | O | O | X | — |
| 315 | 600 | Good | 1.21 | 608 | O | O | O | Δ | X |
| 316* | 650 | Partially flow | 1.39 | 211 | O | X | — | — | — |
| 317* | 700 | Partially flow | 1.65 | 8 | X | — | — | — | — |

A mark "*" denotes a control sample which is not within the scope of the present invention.

EXAMPLE 4

Crystallized glass comprising PbO as a main component which contains $TiO_2$, and a zinc oxide varistor using the same as a material constituting a high resistive side layer will now be explained.

First, each predetermined amount of PbO, ZnO, $B_2O_3$, $SiO_2$, and $TiO_2$ was weighed, and than crystallized glass for coating was prepared according to the same process as that used in Example 1 above. The crystallized glass thus obtained was evaluated for the glass transition point (Tg), the coefficient of linear expansion (α), and the crystallinity. The results are shown in Table 13 below.

TABLE 13

| Name of glass | Composition (percent by weight) PbO | ZnO | $B_2O_3$ | $SiO_2$ | $TiO_2$ | Tg (°C.) | α ($10^{-7}$/°C.) | Crystal-linity |
|---|---|---|---|---|---|---|---|---|
| G401* | 40 | 25 | 5 | 10 | 20 | 360 | 58 | O |
| G402 | 50 | 25 | 5 | 10 | 10 | 363 | 68 | O |
| G403 | 75 | 10 | 5 | 5 | 5 | 344 | 87 | O |
| G404* | 85 | 10 | 5 | 0 | 0 | 315 | 96 | X |
| G405* | 55 | 40 | 5 | 0 | 0 | 350 | 60 | O |
| G406 | 55 | 30 | 10 | 0 | 5 | 361 | 66 | O |
| G407 | 70 | 5 | 15 | 5 | 5 | 375 | 82 | O |
| G408* | 70 | 0 | 20 | 5 | 5 | 396 | 85 | X |
| G409 | 67.5 | 20 | 10 | 0 | 2.5 | 382 | 83 | O |

TABLE 13-continued

| Name of glass | Composition (percent by weight) PbO | ZnO | $B_2O_3$ | $SiO_2$ | $TiO_2$ | Tg (°C.) | α ($10^{-7}$/°C.) | Crystallinity |
|---|---|---|---|---|---|---|---|---|
| G410 | 67.4 | 20 | 10 | 0.1 | 2.5 | 385 | 84 | O |
| G411 | 62.5 | 20 | 10 | 5 | 2.5 | 392 | 78 | O |
| G412 | 57.5 | 20 | 10 | 10 | 2.5 | 401 | 75 | O |
| G413* | 47.5 | 20 | 10 | 20 | 2.5 | 405 | 70 | O |
| G414* | 59.9 | 20 | 10 | 10 | 0.1 | 392 | 71 | O |
| G415 | 59.5 | 20 | 10 | 10 | 0.5 | 400 | 73 | O |
| G416 | 55 | 20 | 10 | 10 | 5 | 404 | 69 | O |
| G417 | 50 | 20 | 10 | 10 | 10 | 408 | 68 | O |
| G418* | 45 | 20 | 10 | 10 | 15 | 420 | 65 | O |

A mark "*" denotes a control sample which is not within the scope of the present invention.

As shown in Table 13, the addition of a large amount of PbO raises the coefficient of linear expansion (α), while the addition of a large amount of ZnO lowers the glass transition point (Tg), which facilitates crystallization of the glass composition. Conversely, the addition of a large amount of $B_2O_3$ raises the glass transition point, and the addition of more than 15.0 percent by weight of $B_2O_3$ causes difficulty in crystallization of the glass composition. Further, with an increase in the amount of $SiO_2$ added, the glass transition point tends to increase, while the coefficient of linear expansion tends to decrease. With an increase in the amount of $TiO_2$ added, the crystallization of glass proceeded. The glass composition comprising a small amount of PbO and $B_2O_3$ tended to become porous.

Next, the aforesaid frit glass was made into paste, after which the resulting glass paste was applied to the sides of the sintered body of Example 1, followed by baking treatment to prepare a sample of a zinc oxide varistor in the same process as that used in Example 1 above. Thereafter, the resulting samples were evaluated for their characteristics. The results are shown in Table 14 below.

tended to peel off, and when exceeding $90\times10^{-7}$/°C. (G404 glass), the glass tended to crack. It is supposed that the samples of glass which cracked or peeled off have poor discharge withstand current rating properties due to the inferior insulating properties of the high resistive side layer. However, even if the coefficient of linear expansion of glass for coating is within the range of $65\times10^{-7}$ to $90\times10^{-7}$/°C., glass with poor crystallinity (G408 glass) tends to crack and also has poor discharge withstand current rating properties. This may be attributed to the fact that the coating film of crystallized glass has higher strength than that of noncrystal glass.

The amount of $TiO_2$ added will now be considered. First, any composition with 0.5 percent by weight or more of $TiO_2$ added has the improved nonlinearity with respect to voltage, accompanied by the improved life characteristics under voltage. This may be attributed to the fact that the addition of 0.5 percent by weight or more of $TiO_2$ raises the insulation resistance of the coating film. On the other hand, the addition of more than 10.0 percent by weight of $TiO_2$ lowers the discharge withstand current rating properties. This may

TABLE 14

| Name of glass | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|
| G401* | Peel off | 1.16 | 480 | X | — | — | — | — |
| G402 | Good | 1.21 | 420 | O | O | Δ | X | — |
| G403 | Good | 1.32 | 331 | O | O | Δ | X | — |
| G404* | Crack | 1.55 | 15 | X | — | — | — | — |
| G405* | Partially Peel off | 1.31 | 181 | Δ | X | — | — | — |
| G406 | Good | 1.24 | 295 | O | O | O | O | X |
| G407 | Good | 1.20 | 316 | O | O | X | — | — |
| G408* | Partially crack | 1.35 | 202 | X | — | — | — | — |
| G409 | Good | 1.25 | 367 | O | Δ | X | — | — |
| G410 | Good | 1.26 | 351 | O | O | Δ | X | — |
| G411 | Good | 1.25 | 410 | O | O | O | X | — |
| G412 | Good | 1.20 | 530 | O | O | X | — | — |
| G413* | Porous | 1.19 | 366 | O | X | — | — | — |
| G414* | Good | 1.34 | 197 | O | X | — | — | — |
| G415 | Good | 1.29 | 348 | O | O | Δ | X | — |
| G416 | Good | 1.17 | 435 | O | O | O | O | X |
| G417 | Good | 1.15 | 650 | O | O | Δ | X | — |
| G418* | Porous | 1.20 | 241 | Δ | X | — | — | — |
| Conventional example | Good | 1.26 | 153 | O | Δ | X | — | — |

A mark "*" denotes a control sample which is not within the scope of the present invention.

The data shown in Tables 13 and 14 indicated that when the coefficient of linear expansion of glass for coating was smaller than $65\times10^{-7}$/°C. (G401, G405 glass), the glass be attributed to the fact that glass tends to become porous due to its poor fluidity during the baking process. Consequently, a PbO—ZnO—$B_2O_3$—$SiO_2$—$TiO_2$ type crystallized glass composition for the high resistive side layer of a zinc oxide varistor is required to comprise $TiO_2$ at least in an amount of 0.5 to 10.0 percent by weight.

The above results confirmed that the most preferable crystallized glass composition for coating comprised 50.0 to 75.0 percent by weight of PbO, 10.0 to 30.0 percent by weight of ZnO, 5.0 to 10.0 percent by weight of $B_2O_3$, 0 to 15.0 percent by weight of $SiO_2$, and 0.5 to 10.0 percent by weight of $TiO_2$. A crystallized glass composition for the high resistive side layer of a zinc oxide varistor is also required to have coefficients of linear expansion in the range of $65\times10^{-7}$ to $90\times10^{-7}$/°C.

Next, by the use of G406 glass shown as a sample of the present invention in Table 13, the amount of glass paste to be applied was examined. The results are shown in Table 15 below. Glass paste was applied in a ratio of 1.0 to 300.0 mg/cm$^2$, which was controlled by the viscosity and the number of application of the paste. As shown in Table 15, when glass paste is applied in a ratio of less than 10.0 mg/cm$^2$ the resulting coating film has low strength, while with a ratio of more than 150.0 mg/cm$^2$ glass tends to flow or have pinholes. Both cases result in poor discharge withstand current rating properties. These results indicated that glass paste was applied most preferably in a ratio of 10.0 to 150.0 mg/cm$^2$.

TABLE 15

| Sample No. | Amount of application (mg/cm$^2$) | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|---|
| 401* | 1 | Good | 1.11 | 314 | X | — | — | — | — |
| 402* | 5 | Good | 1.14 | 380 | Δ | X | — | — | — |
| 403 | 10 | Good | 1.16 | 560 | O | O | Δ | X | — |
| 404 | 50 | Good | 1.17 | 435 | O | O | O | O | X |
| 405 | 150 | Good | 1.25 | 413 | O | O | O | O | X |
| 406* | 200 | Partially flow | 1.29 | 242 | O | X | — | — | — |
| 407* | 300 | Flow | 1.36 | 191 | Δ | X | — | — | — |

A mark "*" denotes a control sample which is not within the scope of the present invention.

Next, by the use of G406 glass shown as a sample of the present invention in Table 13, the conditions under which glass paste was subjected to baking treatment were examined. The results are shown in Table 16 below. The viscosity and the number of application of glass paste were controlled so that the glass paste may be applied in a ratio of 50.0 mg/cm$^2$. Glass paste was subjected to baking treatment at temperatures in the range of 350° to 700° C. for 1 hour in air.

TABLE 16

| Sample No. | Temperature of baking (°C.) | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|---|
| 411* | 350 | Not sintered | 1.10 | 45 | X | — | — | — | — |
| 412* | 400 | Porous | 1.13 | 40 | Δ | X | — | — | — |
| 413 | 450 | Good | 1.15 | 241 | O | O | X | — | — |
| 414 | 500 | Good | 1.16 | 492 | O | O | O | X | — |
| 415 | 600 | Good | 1.23 | 650 | O | O | O | O | — |
| 416* | 650 | Partially flow | 1.34 | 206 | O | X | — | — | — |
| 417* | 700 | Partially flow | 1.58 | 13 | Δ | X | — | — | — |

A mark "*" denotes a control sample which is not within the scope of the present invention.

As a result, when baking treatment was conducted at a temperature of less than 450° C., glass paste was not sufficiently melted, resulting in poor discharge withstand current rating properties. On the other hand, when baking treatment was conducted at a temperature of more than 600° C., the voltage ratio markedly lowered, resulting in poor life characteristics under voltage. These results indicated that glass paste was subjected to baking treatment most preferably at temperatures in the range of 450° to 600° C.

EXAMPLE 5

Crystallized glass comprising PbO as a main component which contains NiO, and a zinc oxide varistor using the same as a material constituting a high resistive side layer will now be explained.

First, each predetermined amount of PbO, ZnO, $B_2O_3$, $SiO_2$, and NiO was weighed, and then crystallized glass for coating was prepared according to the same process as that used in Example 1 above. The crystallized glass thus obtained was evaluated for the glass transition point (Tg), the coefficient of linear expansion (α), and the crystallinity. The results are shown in Table 17 below.

TABLE 17

| Name of glass | Composition (percent by weight) PbO | ZnO | $B_2O_3$ | $SiO_2$ | NiO | Tg (°C.) | α ($10^{-7}$/°C.) | Crystallinity |
|---|---|---|---|---|---|---|---|---|
| G501* | 50 | 25 | 5 | 10 | 10 | 354 | 59 | O |
| G502 | 55 | 25 | 5 | 10 | 5 | 360 | 69 | O |
| G503 | 75 | 10 | 5 | 5 | 5 | 346 | 88 | O |
| G504 | 85 | 10 | 5 | 0 | 0 | 315 | 96 | X |
| G505* | 55 | 40 | 5 | 0 | 0 | 350 | 60 | O |
| G506 | 55 | 30 | 10 | 0 | 5 | 359 | 68 | O |
| G507 | 70 | 5 | 15 | 5 | 5 | 370 | 84 | Δ |
| G508* | 70 | 0 | 20 | 5 | 5 | 394 | 88 | X |
| G509 | 67.5 | 20 | 10 | 0 | 2.5 | 380 | 85 | O |
| G510 | 67.4 | 20 | 10 | 0.1 | 2.5 | 381 | 85 | O |
| G511 | 62.5 | 20 | 10 | 5 | 2.5 | 393 | 78 | O |
| G512 | 57.5 | 20 | 10 | 10 | 2.5 | 404 | 76 | O |
| G513* | 47.5 | 20 | 10 | 20 | 2.5 | 409 | 71 | O |
| G514 | 59.9 | 20 | 10 | 10 | 0.1 | 393 | 72 | O |
| G515 | 59.5 | 20 | 10 | 10 | 0.5 | 395 | 72 | O |
| G516 | 57 | 20 | 10 | 10 | 2.5 | 405 | 70 | O |
| G517 | 55 | 20 | 10 | 10 | 5 | 406 | 69 | O |
| G518* | 50 | 20 | 10 | 10 | 10 | 415 | 63 | O |

A mark "*" denotes a control sample which is not within the scope of the present invention.

As shown in Table 17, the addition of a large amount of PbO raises the coefficient of linear expansion (α), while the addition of a large amount of ZnO lowers the glass transition point (Tg), which facilitates crystallization of the glass composition. Conversely, the addition of a large amount of $B_2O_3$ raises the glass transition point, end the addition of more than 15.0 percent by weight of $B_2O_3$ causes difficulty in crystallization of the glass composition. Further, with an increase in the Mount of $SiO_2$ added, the glass transition point tends to increase, while the coefficient of linear expansion tends to decrease. With an increase in the amount of NiO added, the crystallization of glass proceeded. The glass composition comprising a small amount of PbO and $B_2O_3$ tended to become porous.

Next, the aforesaid frit glass was made into paste, after which the resulting glass paste was applied to the sides of the sintered body of Example 1, followed by baking treatment to prepare a sample of a zinc oxide varistor in the same process as that used in Example 1 above. Thereafter, the resulting samples were evaluated for their characteristics. The results are shown in Table 18 below.

TABLE 18

| Name of glass | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|
| G501* | Peel off | 1.15 | 490 | X | — | — | — | — |
| G502 | Good | 1.20 | 440 | O | O | Δ | X | — |
| G503 | Good | 1.33 | 331 | O | O | Δ | X | — |
| G504* | Crack | 1.55 | 15 | X | — | — | — | — |
| G505* | Partially peel off | 1.31 | 181 | Δ | X | — | — | — |
| G506 | Good | 1.25 | 288 | O | O | O | O | X |
| G507 | Good | 1.22 | 340 | O | O | Δ | X | — |
| G508* | Partially crack | 1.34 | 207 | X | — | — | — | — |
| G509 | Good | 1.25 | 335 | O | Δ | X | — | — |
| G510 | Good | 1.28 | 384 | O | O | O | X | — |
| G511 | Good | 1.27 | 411 | O | O | O | X | — |
| G512 | Good | 1.24 | 492 | O | O | X | — | — |
| G513* | Porous | 1.18 | 375 | Δ | X | — | — | — |
| G514* | Good | 1.33 | 209 | O | X | — | — | — |
| G515 | Good | 1.29 | 394 | O | O | Δ | X | — |
| G516 | Good | 1.18 | 482 | O | O | O | O | Δ |
| G517 | Good | 1.16 | 591 | O | O | O | Δ | X |
| G518* | Porous | 1.23 | 205 | Δ | X | — | — | — |
| Conventional example | Good | 1.26 | 153 | O | Δ | X | — | — |

A mark "*" denotes a control sample which is not within the scope of the present invention.

The data shown in Tables 17 and 18 indicated that when the coefficient of linear expansion of glass for coating was smaller than $65\times10^{-7}/°C$. (G501, G505 glass), the glass tended to peel off, and when exceeding $90\times10^{-7}/°C$ (G504 glass), the glass tended to crack. It is supposed that the samples of glass which cracked or peeled off have poor discharge withstand current rating properties due to the inferior insulating properties of the high resistive side layer. However, even if the coefficient of linear expansion of glass for coating is within the range of $65\times10^{-7}$ to $90\times10^{-7}/°C.$, glass with poor crystallinity (G508 glass) tends to crack and also has poor discharge withstand current rating properties. This may be attributed to the fact that the coating film of crystallized glass has higher strength than that of noncrystal glass.

The amount of NiO added will now be considered. First, any composition with 0.5 percent by weight or more of NiO added has the improved non-linearity with respect to voltage, accompanied by the improved life characteristics under voltage. This may be attributed to the fact that the addition of 0.5 percent by weight or more of NiO raises the insulation resistance of the coating film. On the other hand, the addition of more than 5.0 percent by weight of NiO lowers the discharge withstand current rating properties. This may be attributed to the fact that glass tends to become porous due to its poor fluidity during baking process. Consequently, a PbO—ZnO—$B_2O_3$—$SiO_2$—NiO type crystallized glass composition for the high resistive side layer of a zinc oxide varistor is required to comprise NiO at least in an amount of 0.5 to 5.0 percent by weight.

The above results confirmed that the most preferable crystallized glass composition for coating comprised 55.0 to 75.0 percent by weight of PbO, 10.0 to 30.0 percent by weight of ZnO, 5.0 to 10.0 percent by weight of $B_2O_3$, 0 to 15.0 percent by weight of $SiO_2$, and 0.5 to 5.0 percent by weight of NiO. A crystallized glass composition for the high resistive side layer of a zinc oxide varistor is also required to have coefficients of linear expansion in the range of $65\times10^{-7}$ to $90\times10^{-7}/°C$.

Next, by the use of G516 glass shown as a sample of the present invention in Table 17, the amount of glass paste to be applied was examined. The results are shown in Table 19 below. Glass paste was applied in a ratio of 1.0 to 300.0 mg/cm² which was controlled by the viscosity and the number of application of paste. In this process when glass paste is applied in a ratio of less than 10.0 mg/cm² the resulting coating film has low strength, while with a ratio of more than 150.0 mg/cm² glass tends to flow or have pinholes. Both cases result in poor discharge withstand current rating properties. These results indicated that glass paste was applied most preferably in a ratio of 10.0 to 15.0 mg/cm².

TABLE 19

| Sample No. | Amount of application (mg/cm²) | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|---|
| 501* | 1 | Good | 1.12 | 300 | X | — | — | — | — |
| 502 | 5 | Good | 1.14 | 391 | O | X | — | — | — |
| 503 | 10 | Good | 1.17 | 567 | O | O | O | X | — |
| 504 | 50 | Good | 1.18 | 482 | O | O | O | O | Δ |
| 505 | 150 | Good | 1.26 | 318 | O | O | O | O | X |
| 506* | 200 | Partially flow | 1.29 | 209 | O | X | — | — | — |
| 507* | 300 | Flow | 1.38 | 154 | Δ | X | — | — | — |

A mark "*" denotes a control sample which is not within the scope of the present invention.

Next, by the use of G516 glass shown as a sample of the present invention in Table 17, the conditions under which glass paste was subjected to baking treatment were examined. The results are shown in Table 20 below. The viscosity and the number of application of glass paste were controlled so that the glass paste may be applied in a ratio of 50.0 mg/cm². Glass paste was subjected to baking treatment at temperatures in the range of 350° to 700° C. for 1 hour in air. As a result, when baking treatment was conducted at a temperature of less than 450° C., glass paste was not sufficiently melted, resulting in poor discharge withstand current rating properties. On the other hand, when baking treatment was conducted at a temperature of more than 60° C., the voltage ratio markedly lowered, resulting in poor life characteristics under voltage. These results indicated that glass paste was subjected to baking treatment most preferably at temperatures in the range of 450° to 600° C.

TABLE 20

| Sample No. | Temperature of baking (°C.) | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|---|
| 511* | 350 | Not sintered | 1.11 | 40 | X | — | — | — | — |
| 512* | 400 | Porous | 1.14 | 32 | Δ | X | — | — | — |
| 513 | 450 | Good | 1.14 | 251 | O | O | X | — | — |

TABLE 20-continued

| Sample No. | Temperature of baking (°C.) | Appearance | $V_{1\,mA}/V_{10\,\mu A}$ | Life under voltage (Time) | Discharge withstand current rating properties 40 kA | 50 kA | 60 kA | 70 kA | 80 kA |
|---|---|---|---|---|---|---|---|---|---|
| 514 | 500 | Good | 1.17 | 483 | O | O | O | X | — |
| 515 | 600 | Good | 1.25 | 644 | O | O | O | O | X |
| 516* | 650 | Partially flow | 1.33 | 217 | O | X | — | — | — |
| 517* | 700 | Partially flow | 1.54 | 12 | Δ | X | — | — | — |

A mark "*" denotes a control sample which is not within the scope of the present invention.

As typical examples of crystallized glass comprising PbO as a main component, described are four-components type such as $PbO—ZnO—B_2O_3—SiO_2$ in Example 1 above, four-components type such as $PbO—ZnO—B_2O_3—MoO_3$, and five-components type such as $PbO—ZnO—B_2O_3—SiO_2—MoO_3$ in Example 2, five-components type such as $PbO—ZnO—B_2O_3—SiO_2—WO_3$ in Example 3, four-components Type such as $PbO—ZnO—B_2O_3—TiO_2$, and five-components type such as $PbO—ZnO—B_2O_3—SiO_2—TiO_2$ in Example 4, and four-components type such as $PbO—ZnO—B_2O_3—NiO$ and five-components type such as $PbO—ZnO—B_2O_3—SiO_2—NiO$ in Example 5. The effect of the present invention may not vary according to the addition of an additive which further facilitates crystallization of glass such as $Al_2O_3$ or $SnO_2$.

As a substance for lowering the glass transition point, ZnO was used in the above examples, and it is needless to say that other substances such as $V_2O_5$ which are capable of lowering the glass transition point may also be used as a substitute thereof. Further, as a typical example of an oxide ceramic, crystallized glass for coating comprising PbO as a main component of the present invention is used for a zinc oxide varistor in the examples of the present invention. This crystallized glass may be applied quite similarly to any oxide ceramics employed for a strontium titanate type varistor, a barium Titanate type capacitor, a PTC thermistor, or a metallic oxide type NTC thermistor.

Industrial Applicability

As indicated above, the present invention can provide a zinc oxide varistor excellent in the nonlinearity with respect to voltage, the discharge withstand current rating properties, and the life characteristics under voltage by using various PbO type crystallized glass with high crystallinity and strong coating film as a material constituting the high resistive side layer formed on a sintered body comprising zinc oxide as a main component. A zinc oxide varistor of the present invention has very high availability as a characteristic element of an arrestor for protecting a transmission and distribution line and peripheral devices thereof requiring high reliability from surge voltage created by lightning.

Crystallized glass for coating comprising PbO as a main component of the present invention may be used as a covering material for not only a zinc oxide varistor but also various oxide ceramics employed for a strontium titanate type varistor, a barium titanate type capacitor, a positive thermistor, etc., and a metallic oxide type negative thermistor and a resistor to enhance the strength and stabilize or improve the various electric characteristics thereof. Moreover, apparent from above examples, conventional glass for coating tends to have a porous structure because it is composite glass containing feldspar, whereas the PbO type crystallized glass of the present invention is also capable of improving the chemical resistance and the moisture resistance due to the high crystallinity end the tendency to have a uniform end close structure, thereby promising many very useful applications.

I claim:

1. A crystallized glass composition for coating a zinc oxide varistor having varistor characteristics, the composition consisting of 50.0 to 64 percent by weight of PbO, 25 to 30.0 percent by weight of ZnO, 5.0 to 10.0 percent by weight of $B_2O_3$, and 6.0 to 15.0 percent by weight of $SiO_2$.

2. The crystallized glass composition according to claim 1, having a coefficient of linear expansion in the range of $65\times10^{-7}$ to $90\times10^{-7}$/°C.

3. The crystallized glass composition according to claim 1 consisting of 60 percent by weight of PbO, 29 percent by weight of ZnO, 5 percent by weight of $B_2O_3$, and 6 percent by weight of $SiO_2$.

4. The crystallized glass composition according to claim 1 consisting of 62.5 percent by weight of PbO, 25 percent by weight of ZnO, 5 percent by weight of $B_2O_3$, and 7.5 percent by weight of $SiO_2$.

5. A crystallized glass composition for coating a zinc oxide varistor having varistor characteristics, the composition consisting of 50.0 to 70 percent by weight of PbO, 20 to 30.0 percent by weight of ZnO, 5.0 to 15 percent by weight of $B_2O_3$, 0 to 15.0 percent by weight of $SiO_2$, and 0.1 to 10.0 percent by weight of $MoO_3$.

6. The crystallized glass composition according to claim 5 having a coefficient of linear expansion in the range of $65\times10^{-7}$ to $90\times10^{-7}$/°C.

7. A crystallized glass composition for coating a zinc oxide varistor having varistor characteristics, the composition consisting of 50.0 to 55 percent by weight of PbO, 20 to 30.0 percent by weight of ZnO, 5.0 to 10.0 percent by weight of $B_2O_3$, 5 to 15.0 percent be weight of $SiO_2$, and 5 to 10.0 percent by weight $MoO_3$.

8. A crystallized glass composition for coating a zinc oxide varistor having varistor characteristics, the composition consisting of 50 percent by weight of PbO, 25 percent by weight of ZnO, 5 percent by weight of $B_2O_3$, 10 percent by weight of $SiO_2$, and 10 percent by weight of $MoO_3$.

9. A crystallized glass composition for coating a zinc oxide varistor having varistor characteristics, the composition consisting of 50 percent by weight of PbO, 20 percent by weight of ZnO, 10 percent by weight of $B_2O_3$, 10 percent by weight of $SiO_2$, and 10 percent by weight of $MoO_3$.

10. A crystallized glass composition for coating a zinc oxide varistor having varistor characteristics, the composition consisting of 50.0 to 70 percent by weight of PbO, 20 to 30.0 percent by weight of ZnO, 5.0 to 15.0 percent by weight of $B_2O_3$, 0.5 to 15.0 percent by weight of $SiO_2$, and 0.1 to 10.0 percent by weight of $WO_3$.

11. The crystallized glass composition according to claim 10 having a coefficient of linear expansion in the range of $65\times10^{-7}$ to $90\times10^{-7}$/° C.

12. A crystallized glass composition for coating a zinc oxide varistor having varistor characteristics, the composition consisting of 50.0 to 55 percent by weight of PbO, 20 to 30.0 percent by weight of ZnO, 5.0 to 10 percent by weight of $B_2O_3$, 5 to 15.0 percent by weight of $SiO_2$, and 5 to 10.0 percent by weight of $WO_3$.

13. A crystallized glass composition for coating a zinc oxide varistor having varistor characteristics, the composition consisting of 50 percent by weight of PbO, 20 percent by weight of ZnO, 10 percent by weight of $B_2O_3$, 10 percent by weight of $SiO_2$, and 10 percent by weight of $WO_3$.

14. A crystallized glass composition for coating a zinc oxide varistor having varistor characteristics, the composition consisting of 50.0 to 55 percent by weight of PbO, 10.0 to 30.0 percent by weight of ZnO, 5.0 to 15.0 percent by weight of $B_2O_3$, 0 to 15.0 percent by weight of $SiO_2$, and 0.5 to 10.0 percent by weight of $TiO_2$.

15. A crystallized glass composition for coating a zinc oxide varistor having varistor characteristics, the composition consisting of 50.0 to 75.0 percent by weight of PbO, 25 to 30.0 percent by weight of ZnO, 5.0 to 15.0 percent by weight of $B_2O_3$, 0 to 15.0 percent by weight of $SiO_2$, and 0.5 to 10.0 percent by weight of $TiO_2$.

16. A crystallized glass composition for coating a zinc oxide varistor having varistor characteristics, the composition consisting of 50.0 to 75.0 percent by weight of PbO, 10.0 to 30.0 percent by weight of ZnO, 5.0 to 15.0 percent by weight of $B_2O_3$, 0 to 0.1 percent by weight of $SiO_2$, and 0.5 to 10.0 percent by weight of $TiO_2$.

17. A crystallized glass composition for coating a zinc oxide varistor having varistor characteristics, the composition consisting of 50.0 to 75.0 percent by weight of PbO, 10.0 to 30.0 percent by weight of ZnO, 5.0 to 15.0 percent by weight of $B_2O_3$, 0 to 15.0 percent by weight of $SiO_2$, and 0.5 to 2.5 percent by weight of $TiO_2$.

* * * * *